US006721834B2

(12) United States Patent
Das et al.

(10) Patent No.: US 6,721,834 B2
(45) Date of Patent: Apr. 13, 2004

(54) RATE ADAPTATION IN A WIRELESS COMMUNICATION SYSTEM

(75) Inventors: Arnab Das, Old Bridge, NJ (US); Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 477 days.

(21) Appl. No.: 09/780,602

(22) Filed: Feb. 9, 2001

(65) Prior Publication Data

US 2002/0152342 A1 Oct. 17, 2002

(51) Int. Cl.[7] ........................ G06F 13/362; H04B 7/216

(52) U.S. Cl. ........................ 710/117; 714/748; 370/342

(58) Field of Search .............................. 710/45, 37, 38, 710/117; 714/748, 751, 795; 370/347, 320, 335, 337, 442, 458, 342

(56) References Cited

U.S. PATENT DOCUMENTS 4,939,731 A 7/1990 Reed et al.
5,931,964 A * 8/1999 Beming et al. ............. 714/748
6,138,260 A * 10/2000 Ketseoglou ................. 714/751
6,574,211 B2 * 6/2003 Padovani et al. ........... 370/347

FOREIGN PATENT DOCUMENTS

EP 0 938 207 A2 2/1999

OTHER PUBLICATIONS

M. Naijoh et al, "ARQ Schemes With Adaptive Modulation/TDMA/TDD Systems For Wireless Multimedia Communication Services", The 8$^{th}$ IEEE International Symposium on Helsinki, Finland, Sep. 1–4, 1997, New York, NY, pp. 709–713 (XP010247739).
European Search Report.

* cited by examiner

*Primary Examiner*—Khanh Dang
(74) *Attorney, Agent, or Firm*—Stephen M. Gurey

(57) ABSTRACT

Disclosed is a method of data rate adaptation based on channel conditions. In the present invention, data is initially transmitted at a first data rate based on a measured first channel condition and, if a NACK is received, the data is retransmitted. The data retransmitted is at a rate which is based on the condition of the channel during or before the transmission of the NACK. The data retransmission rate can also be based on the actual channel condition at the time of the first transmission plus the condition of the channel before or during the transmission of the NACK.

7 Claims, 3 Drawing Sheets

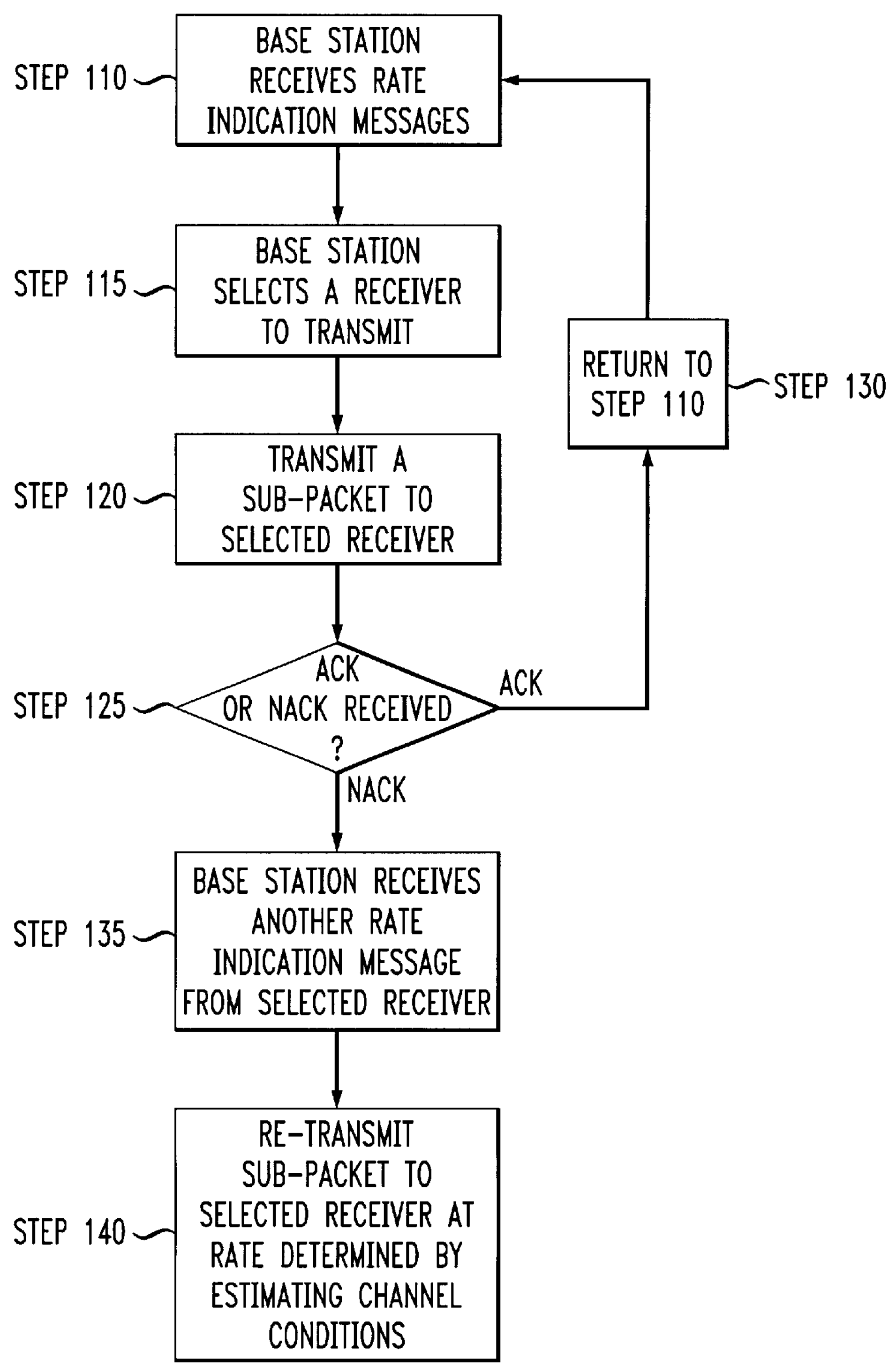
FIG. 1
100
BASE STATION RECEIVES RATE INDICATION MESSAGES
STEP 110
BASE STATION SELECTS A RECEIVER TO TRANSMIT
STEP 115
TRANSMIT A SUB-PACKET TO SELECTED RECEIVER
STEP 120
ACK OR NACK RECEIVED ?
STEP 125
ACK
NACK
RETURN TO STEP 110
STEP 130
BASE STATION RECEIVES ANOTHER RATE INDICATION MESSAGE FROM SELECTED RECEIVER
STEP 135
RE-TRANSMIT SUB-PACKET TO SELECTED RECEIVER AT RATE DETERMINED BY ESTIMATING CHANNEL CONDITIONS
STEP 140

200
STEP 210
BASE STATION TRANSMITS A DATA RATE
STEP 215
ENCODER PACKET IS PROCESSED INTO A SUB-PACKET
STEP 220
ADD ENCODER PACKET SIZE IDENTIFIER TO SUB-PACKET
STEP 225
MODULATE AND TRANSMIT SUB-PACKET

RATE ADAPTATION IN A WIRELESS COMMUNICATION SYSTEM

CROSS REFERENCE TO RELATED APPLICATION

Related subject matter is disclosed in the following application assigned to the same assignee hereof: U.S. patent application entitled "Sub-Packet Adaptation In A Wireless Communication System", Ser. No. 09/725,393, filed Nov. 29, 2000.

FIELD OF THE INVENTION

The present invention relates generally to wireless communication systems and, in particular, to rate adaptation of data transmission in a wireless communication systems.

BACKGROUND OF THE RELATED ART

In the well-known Data Only Evolution of third generation CDMA based wireless communication systems, hereinafter referred to as 3G-1xEVDO, voice and data services are provided using separate frequency carriers. That is, the voice and data signals are transmitted over separate forward links defined by different frequency carriers. Data is transmitted over a time multiplexed frequency carrier at fixed data transmit powers but at variable data rates. Specifically, measured Signal to Interference Ratio (SIR) at a receiver of a pilot signal transmitted by a base station is used to determine a data rate which can be supported by the receiver. Typically, the determined data rate corresponds to a maximum data rate at which a minimum level of quality of service can be achieved at the receiver. Higher measured SIR translates into higher data rates, wherein higher data rates involve higher order modulation and weaker coding than lower data rates. For example, if measured SIR at the receiver is 12 dB and −2 dB at two different receivers, then the data rates may be 2.4 Mb/s and 38.4 Kb/s at each of the respective receivers.

To improve system throughput, 3G-1x EVDO allows the receiver with the most favorable channel conditions, i.e., highest measured SIR, and thereby the highest associated data rate, to transmit ahead of receivers with comparatively less favorable channel conditions. 3G-1xEVDO utilizes a fast rate adaptation mechanism whereby the receiver, for every time slot, measures SIR, calculates a data rate using the measured SIR and reports the calculated data rate to the base station. Calculated data rates from multiple receivers are used by the base station to schedule when data transmission is to occur for a particular receiver.

Data transmission from the base station to a particular receiver occurs when that receiver reports the highest calculated data rate to the base station. The following protocol is utilized in data transmissions. The base station transmits data to the receiver in time slot n at the calculated data rate. The receiver receives the data transmission and responds with an ACK/NACK message indicating to the base station whether the data transmission was successfully received, i.e., no errors, by the receiver. Specifically, if the data transmission is successfully received, the receiver responds with an acknowledgement or ACK. Otherwise the receiver responds with a negative acknowledgement or NACK. The ACK/NACK message is received by base station in time slot n+j, wherein j is some known time offset. Thus, the base station can determine that an ACK/NACK message was transmitted from a receiver to which data was transmitted j time slots prior to receipt of the ACK/NACK message.

If an ACK was received, the base station knows that the data transmission to the associated receiver was successful. If a NACK was received, the base station knows that the data transmission to the associated receiver was unsuccessful. In response to the NACK, the base station re-transmits, at the same data rate, the same data which was earlier transmitted. Note that the term "re-transmits the same data" should be understood to describe a retransmission of the data that may or may not be identical to the data it is being compared to, i.e., data transmitted in a previous transmission, so long as the data of the retransmission may be soft combined with the data to which it is being compared. The re-transmitted data is received by the receiver in time slot n+j+k, wherein k is some known time offset.

This prior art protocol disadvantageously utilizes the data rate of the initial transmission for re-transmissions even if the channel conditions may have changed for the associated receiver. Specifically, if the channel conditions degraded between the time of the initial transmission and the re-transmission, the re-transmission will likely suffer a higher frame error rate (FER) than the initial transmission, thereby suffering a degradation in transmission quality. Or if the channel conditions improved, then channel resources are being inefficiently utilized since a higher data rate could had been used for the re-transmission.

SUMMARY OF THE PRESENT INVENTION

The present invention is a method of data rate adaptation based on channel conditions. In the present invention, data is initially transmitted at a first data rate based on a measured first channel condition and, if a NACK is received, the data is retransmitted. The data retransmitted is at a rate which is based on the condition of the channel during or before the transmission of the NACK. The data retransmission rate can also be based on the actual channel condition at the time of the first transmission plus the condition of the channel before or during the transmission of the NACK.

BRIEF DESCRIPTION OF THE DRAWINGS

The features, aspects, and advantages of the present invention will become better understood with regard to the following description, appended claims, and accompanying drawings where:

FIG. 1 depicts a flowchart illustrating the data rate adaptation technique in accordance with one embodiment of the present invention;

DETAILED DESCRIPTION

Figure 2:
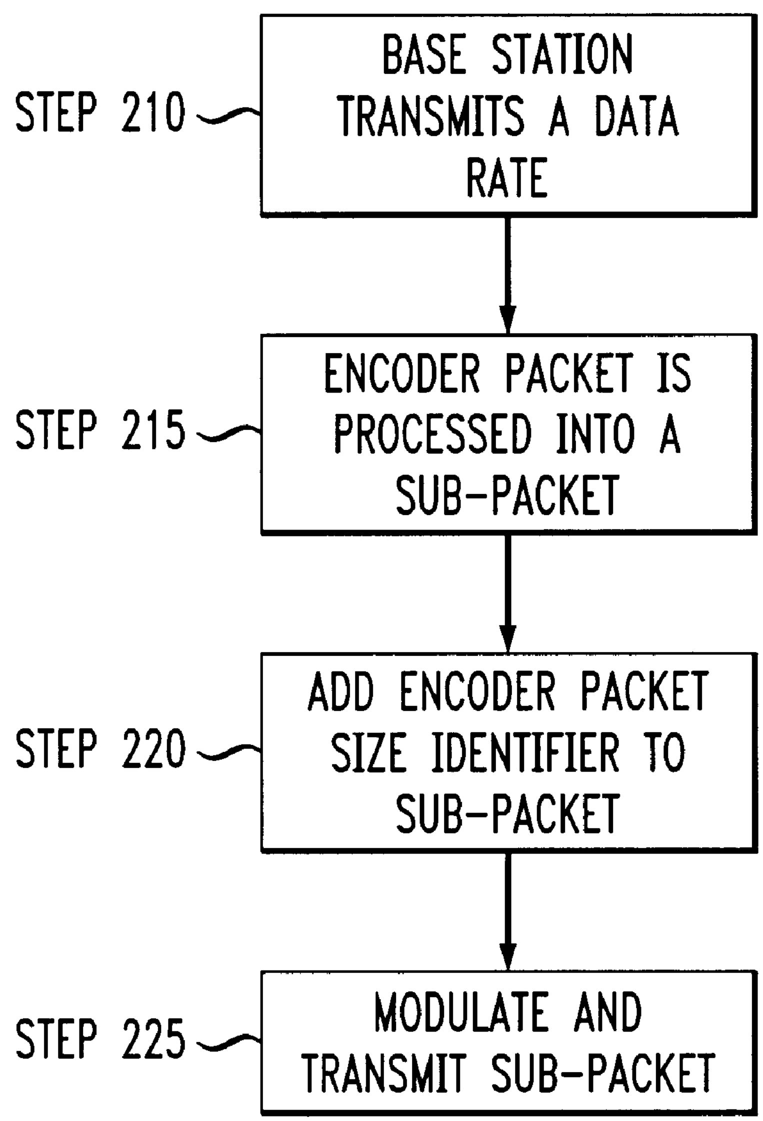
FIG. 2 depicts a flowchart illustrating a manner of varying the size of the sub-packets, the modulation scheme and number of time slots over which the sub-packets are transmitted in accordance with one embodiment of the present invention.

The present invention is a method of data rate adaptation based on channel conditions. FIG. 1 depicts a flowchart 100 illustrating the data rate adaptation technique in accordance with one embodiment of the present invention. In step 110, a base station or transmitting equipment receives rate indication messages from a plurality of receivers to which data transmissions are intended, wherein a rate indication message may be a channel condition measurement at a receiver or a data rate calculated based on a channel condition measurement at a receiver. In step 115, the base station selects a receiver at which to transmit data, wherein the selected receiver preferably is associated with the highest data rate. In step 120, the base station transmits a sub-packet of data to the selected receiver at the data rate indicated by the associated rate indication message.

In another embodiment, the sub-packet transmitted in step 120 may be transmitted at a data rate higher than the data rate indicated in the rate indication message. The reason for doing this is to decrease the amount of time slots over which the sub-packets are to be transmitted in step 120. Although the transmission quality may degrade because of the increased data rate, Hybrid ARQ may be used to soft combine the sub-packets transmitted in step 140 with the sub-packets transmitted in step 120. Under certain conditions, e.g. at lower data rates, when using Hybrid ARQ (soft combining) throughput efficiency of the channel can be improved through the "aggressive" use of the channel, i.e., transmitting at higher data rates than indicated by the receiver.

The data rate at which the encoder sub-packets are transmitted may be negotiated between the base station and receiver anytime prior to the actual transmission of the encoder sub-packets. For example, the receiver transmits a rate indication message to the base station indicating a data rate of 19.2 Kb/s. The base station wants to be aggressive with the data transmission by using a data rate of 76.8 Kb/s to transmit an encoder sub-packet to the receiver. Accordingly, the base station transmits a new rate message to the receiver indicating the new data rate at which the base station will be transmitting the encoder sub-packet to the receiver, wherein the new data rate indicated may or may not be the same as the data rate indicated in the data rate message. Upon receipt of the new rate message, the receiver would know the data rate to use in decoding the encoder sub-packet.

The new data rate is based on the data rate message and the size of the encoder packet. For larger size encoder packets, it is desirable to set the new data rate as a higher multiple, e.g., four times, of the data rate indicated in the data rate message in order to reduce the number of time slots utilized in the transmission and to promote scheduling flexibility. By contrast, for smaller size encoder packets, it is desirable to set the new data rate as a lower multiple, e.g., one times, of the data rate indicated in the data rate message in order to utilize the channel more efficiently.

Table I depicts an example lookup table which may be used in selecting a new data rate based on the data rate indicated by the receiver and the size of the encoder packet. For example, suppose the data rate message indicates a data rate of 38.4 Kb/s and the encoder packet is 1,536 bits. The new rate message would then indicate a new data rate of 153.6 Kb/s.

TABLE I

| Data Rate Indicated In Data Rate Message Kb/s | Data Rates For 7,680 Bit Encoder Packet Kb/s | Data Rates For 3,072 Bit Encoder Packet Kb/s | Data Rates For 1,536 Bit Encoder Packet Kb/s | Data Rates For 768 Bit Encoder Packet Kb/s |
|---|---|---|---|---|
| 9.6 | 38.4 | 38.4 | 38.4 | 38.4 |
| 19.2 | 76.8 | 76.8 | 76.8 | 76.8 |
| 38.4 | 153.6 | 153.6 | 153.6 | 153.6 |
| 76.8 | 307.2 | 307.2 | 307.2 | 307.2 |
| 153.6 | 614.4 | 614.4 | 614.4 | 614.4 |
| 307.6 | 877.7 | 819.2 | 614.4 | 614.4 |
| 614.4 | 1228.8 | 1228.8 | 1228.8 | 614.4 |
| 819.2 | 1536.0 | 1228.8 | 1228.8 | 614.4 |
| 1228.8 | 2048.0 | 2457.6 | 1228.8 | 614.4 |
| 1536.0 | 3072.0 | 2457.6 | 1228.8 | 614.4 |
| 2048.0 | 3072.0 | 2457.6 | 1228.8 | 614.4 |
| 2457.6 | 3072.0 | 2457.6 | 1228.8 | 614.4 |

In step 125, the base station receives an ACK/NACK message from the selected receiver. If the message is an ACK, in step 130, flowchart 100 returns to step 110. If the message is a NACK, in step 135, the base station receives from the selected receiver another rate (rate adaptation) indication message. Additionally, when a NACK is transmitted by the receiver, the receiver stores in memory the received data which was transmitted in step 120 such that it may later be soft combined with a re-transmission of the same data.

Figure 4:
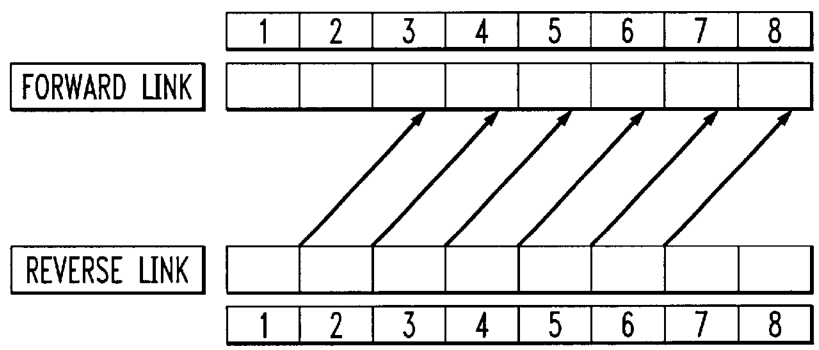
FIG. 4 is an example of rate adaptation with three slots rate feedback delay.

An example of rate adaptation is shown in FIG. 4. The transmission rate used in slot n is based on channel condition (quality) measurements in slot (n−3) assuming three slots feedback delay. With Hybrid ARQ, if a frame is received in error, the receiver stores the frame and sends back a NACK to the transmitter. The transmitter performs a retransmission and the two transmissions can be combined and the frame can be decoded with higher success probability. The number of transmissions/retransmission across which the hybrid ARQ operation is done can be a larger number greater than 2.

With adaptive Hybrid ARQ, the retransmissions can be performed at a different rate compared to the original transmission. The rate at the time of retransmission is based on the most recent channel condition information received from the receiver. The ACK/NACK for transmission in slot n is received in slot (n+3) where 3 is the ACK/NACK feedback delay.

If the message is a NACK, in step 135, the base station receives from the selected receiver another rate indication message which is based on the delayed channel condition information that is due to feedback delay in addition to the actual channel condition at the time of the previous transmission. Stated differently, the rate of retransmission is based on estimating the channel condition at the time of transmission of the NACK. The rate of retransmission can also be based on estimating two conditions, one being channel condition at the time of transmission of the NACK; and the other estimate being the actual channel condition at the time of the transmission of the data. The estimates enable the transmitter to make an estimate about the quality of the previously received information and the amount of redundant information needed to successfully decode the received data.

In step 140, the base station re-transmits the sub-packet of data to the selected receiver at the data rate indicated in the second rate indication message received in step 135.

In one embodiment, the sub-packet of data transmitted in steps 120 and 140 are of the same size but the number of time slots over which the sub-packets are transmitted or modulation scheme may vary if the data rates in steps 120 and 140 are different. In another embodiment, such sub-packet are of different sizes if Hybrid ARQ are used to soft combine the sub-packets transmitted in steps 120 and 140.

In an alternate embodiment, regardless of whether the ACK/NACK message transmitted by the selected receiver is an ACK or a NACK, flowchart 100 returns to step 110 from step 125. In this embodiment, the re-transmission to the originally selected receiver would not occur until the selected receiver is the receiver with the highest associated data rate.

In a preferred embodiment, the manner in which sub-packets are transmitted in steps 120 and 140 allows for Hybrid ARQ at different data rates. This embodiment is achieved by varying the size of the sub-packets, the modulation scheme and number of time slots over which the sub-packets are transmitted. FIG. 2 depicts a flowchart 200 illustrating a manner of varying the size of the sub-packets, the modulation scheme and number of time slots over which the sub-packets are transmitted in accordance with one embodiment of the present invention. In step 210, at the connection set-up to a new receiver, or through other broadcast means, the base station indicates to the receiver the data transmission rate that will be used by the base station corresponding to a rate indication message from the receiver and each of the encoder packet sizes (as shown in Table 1). Alternatively, the base station transmits a new rate message to the selected receiver indicating the new data rate at which the base station intends to transmit data to the selected receiver. In another embodiment, the new rate message may be included in the header information or along with the encoder packet size indication. In step 215, an encoder packet is processed into a specific size encoder sub-packet, wherein the encoder packet is a block of information intended for the receiver and the encoder sub-packet is a representation of the encoder packet which is transmitted to the receiver. Specifically, the encoder packet is channel coded and subsequently punctured and/or repeated to obtain a sub-packet. The size of the sub-packet being dependent on the data rate at which the sub-packet is to be transmitted and the size of the encoder packet.

Figure 3:
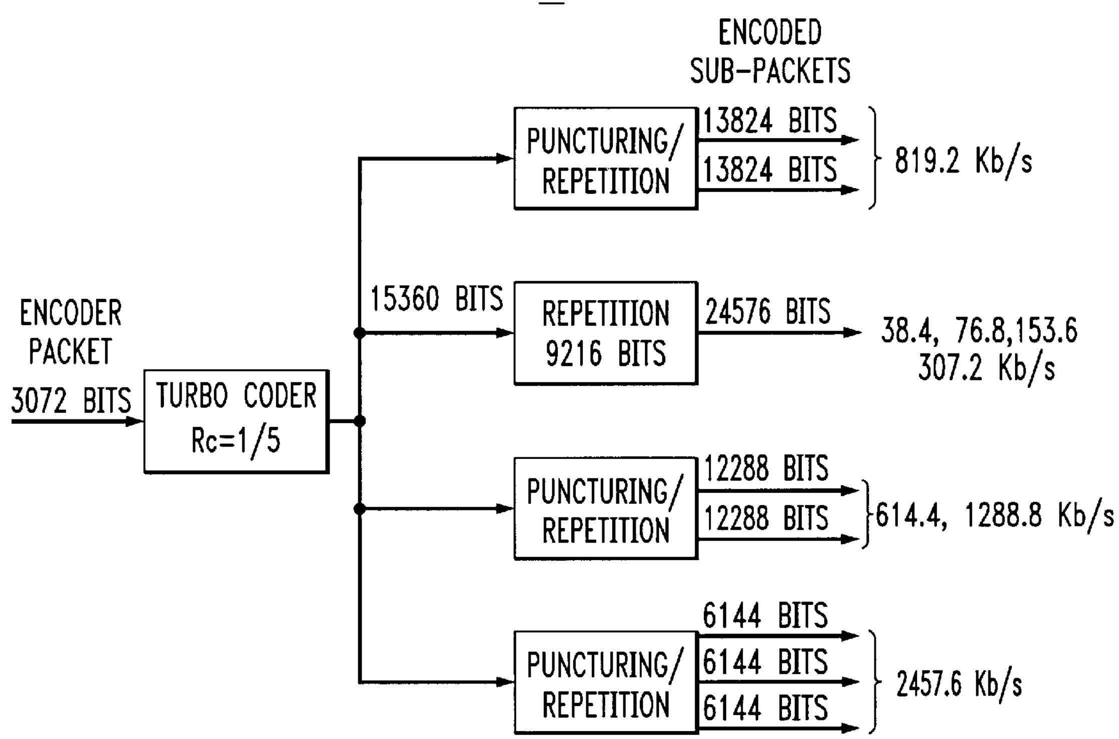
FIG. 3 depicts a flowchart illustrating a manner of varying the size of the sub-packets, the modulation scheme and number of time slots over which the sub-packets are transmitted in accordance with one embodiment of the present invention.

FIG. 3 depicts an example 30 of a sub-packet formation scheme in accordance with this embodiment of the present invention. An encoder packet comprising of 3,072 bits is turbo coded at ⅕ rate into 15,360 bits. Note that, in this example, a same channel coder is used to channel code the encoder packet regardless of the size of the sub-packet. The channel coded encoder packet, i.e., 15,360 bits, then undergoes different puncturing and/or repetition techniques to obtain four different size encoder sub-packets, wherein the original encoder packet may be derived from each of the encoder sub-packets. Specifically, the channel coded encoder packet is punctured and/or repeated to produce two 13,824 bit encoder sub-packets, one 24,576 bit encoder sub-packet, two 12,288 bit encoder sub-packets and/or three 6,144 bit encoder sub-packets. The two 13,824 bit encoder sub-packet may or may not be identical to each other. Likewise for the two 12,288 bit encoder sub-packets and three 6,144 bit encoder sub-packets. Each of the encoder sub-packets may be soft combined with each other.

Note that each of the encoder sub-packets are associated with different data rates. That is, the two 13,824 bit encoder sub-packets are associated with a data rate of 819.2 Kb/s; the 24,576 bit encoder sub-packet is associated with data rates of 38.4 Kb/s, 76.8 Kb/s, 153.6 Kb/s and 307.2 Kb/s; the two 12,288 bit encoder sub-packets are associated with data rates of 614.4 Kb/s and 1288.8 Kb/s; and the three 6,144 bit encoder sub-packets are associated with a data rate of 2457.6 Kb/s. Thus, if the data rate at which the sub-packet was to be transmitted was 153.6 Kb/s, the sub-packet size would be 24,576 bits. Note that there exists a single sub-packet format for a given data rate and encoder packet size. Although FIG. 3 depicts all eight different sub-packets being simultaneously produced, all eight of the encoder sub-packets need not be produced at the same time.

Returning to FIG. 2, in step 220, an encoder packet size identifier is added to the encoder sub-packet, wherein the encoder packet size identifier indicates the size of the packet from which the encoder sub-packet was derived. Based on the encoder packet size identifier and the transmission data rate, the receiver can determine the format of the sub-packet such that the receiver can correctly soft combine and jointly decode the associated encoder sub-packet with a re-transmission or a prior transmission of an encoder sub-packet derived from the same encoder packet (although the latter sub-packet may be in a different format). Recall that there exists a single sub-packet format for a given data rate and encoder packet size. The data rate is known to the receiver based on one of many alternate embodiments discussed above. The transmission data rate is mapped from the rate indication message from the receiver, either based on a mapping that is indicated to the receiver at connection set-up, or on a broadcast channel. Otherwise, the transmission data rate is transmitted in a message or in data header information to the receiver.

In another embodiment, whether or not there exists a single sub-packet format for a given data rate and encoder packet size, an encoder sub-packet format identifier may be added to the encoder sub-packet in lieu of, or in conjunction with, the encoder sub-packet size identifier. The encoder sub-packet format identifier indicating a format of the associated encoder sub-packet such that the receiver knows how to derive the encoder packet from the encoder sub-packet.

In step 225, the encoder sub-packet is modulated and transmitted to the receiver over one or more time slots. The type of modulation scheme used to modulate the encoder sub-packet depends on the new data rate. Table II depicts an example lookup table which may be used in selecting a modulation scheme based on the new data rate. As can be seen, higher modulations (with more bits per symbol) are required to achieve the higher data rates. For example, if the new data rate is 307.2 Kb/s, then the modulation scheme used to transmit the encoder sub-packet would be QPSK.

TABLE II

| New Data Rate | Modulation Scheme |
|---|---|
| 9.6 | QPSK |
| 19.2 | QPSK |
| 38.4 | QPSK |
| 76.8 | QPSK |
| 153.6 | QPSK |
| 307.2 | QPSK |
| 614.4 | QPSK |
| 819.2 | 8-PSK |
| 1228.8 | QPSK/16-QAM |
| 1536.0 | 16-QAM |
| 2048.0 | 16-QAM |
| 2457.6 | 16-QAM |
| 3072.2 | 16-QAM |

The number of time slots used in the transmission of the encoder sub-packet depends on the new data rate and the size of the encoder packet (or encoder sub-packet). Table III depicts an example lookup table which may used in determining the number of time slots required for transmitting a particular size encoder packet at the new data rate.

TABLE III

| 7,680 Bit Encoder Packet | | 3,072 Bit Encoder Packet | | 1,536 Bit Encoder Packet | | 768 Bit Encoder Packet | |
|---|---|---|---|---|---|---|---|
| Data Rate | Time Slots | Data Rate | Time Slots | Data Rate | Time Slots | Data Rate | Time Slots |
| 38.4 | 160 | 38.4 | 64 | 38.4 | 32 | 38.4 | 16 |
| 76.8 | 80 | 76.8 | 32 | 76.8 | 16 | 76.8 | 8 |
| 153.6 | 40 | 153.6 | 16 | 153.6 | 8 | 153.6 | 4 |
| 307.2 | 20 | 307.2 | 8 | 307.2 | 4 | 307.2 | 2 |
| 614.4 | 10 | 614.4 | 4 | 614.4 | 2 | 614.4 | 1 |
| 877.7 | 7 | 819.2 | 3 | 614.4 | 2 | 614.4 | 1 |
| 1228.8 | 5 | 1228.8 | 2 | 1228.8 | 1 | 614.4 | 1 |
| 1536.0 | 4 | 1228.8 | 2 | 1228.8 | 1 | 614.4 | 1 |
| 2048.0 | 3 | 2457.6 | 1 | 1228.8 | 1 | 614.4 | 1 |
| 3072.0 | 2 | 2457.6 | 1 | 1228.8 | 1 | 614.4 | 1 |
| 3072.0 | 2 | 2457.6 | 1 | 1228.8 | 1 | 614.4 | 1 |
| 3072.0 | 2 | 2457.6 | 1 | 1228.8 | 1 | 614.4 | 1 |

Although the present invention has been described in considerable detail with reference to certain embodiments, other versions are possible. For example, the present invention is also applicable to encoder packets which are not 3,072 bits in size; the encoder sub-packet sizes may vary; the data rate at which particular encoder sub-packets may vary; etc. Therefore, the spirit and scope of the present invention should not be limited to the description of the embodiments contained herein.

We claim:

1. A method of communicating with a receiver comprising the steps of:

transmitting data to the receiver at a first data rate that is determined at least in part based on first received channel condition information; and in response to an indication that the transmitted data was not successfully received, retransmitting the data to the receiver at a second data rate that is determined at least in part based on the first received channel condition information and on second received channel condition information that is received subsequent to the first channel condition information.

2. The method of claim 1 wherein the second data rate is determined in part based on an estimate of the data redundancy needed for successfully decoding the data.

3. The method of claim 1 wherein the transmitted data and the retransmitted data are identical.

4. The method of claim 1 wherein the retransmitted data may be soft combined with the transmitted data.

5. The method of claim 1 wherein the first received channel condition information is a first rate indication message and the first data rate is a rate that is higher than a data rate indicated in the first rate indication message.

6. The method of claim 1 wherein the second received channel condition information is a second rate indication message and the second data rate is a rate that is higher than a data rate indicated in the second rate indication message.

7. The method of claim 1 wherein the indication that the transmitted data was not successfully received is a NACK.

* * * * *